Jan. 30, 1934.   J. Y. BLAZEK ET AL   1,945,476
PARTS MOVING MEANS
Filed Feb. 25, 1933
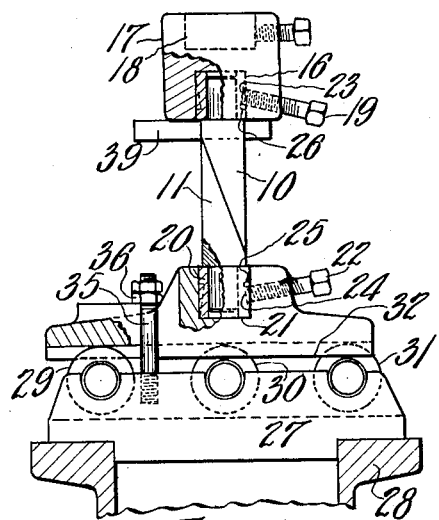
Fig. 1
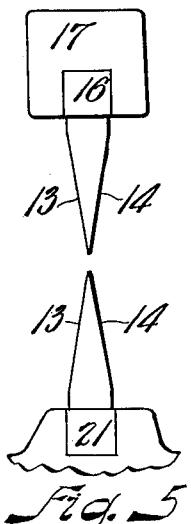
Fig. 5
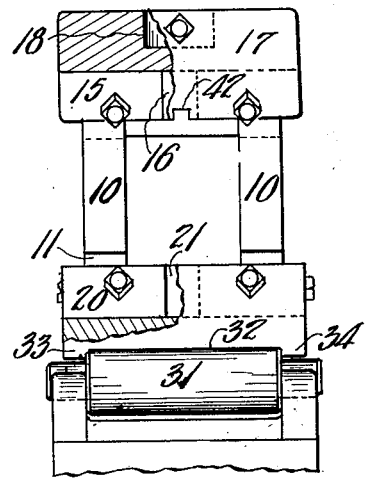
Fig. 2
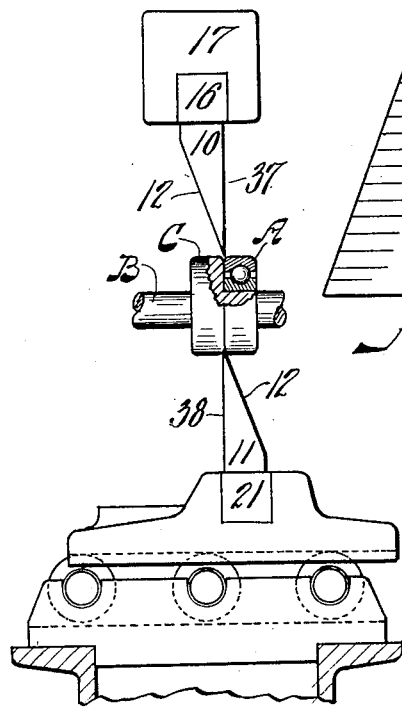
Fig. 3
Fig. 6
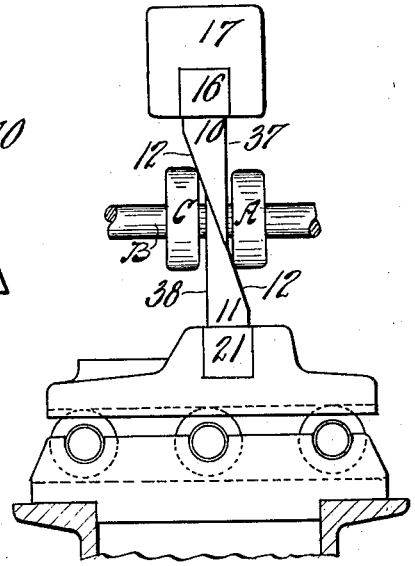
Fig. 4
INVENTORS
John Y. Blazek
and
Russell G. Anderson
By C. F. Heinkel
ATTORNEY Patented Jan. 30, 1934

1,945,476

UNITED STATES PATENT OFFICE 1,945,476

PARTS MOVING MEANS

John Y. Blazek, Maple Heights, and Russell G. Anderson, Cleveland, Ohio, assignors to Lempco Products Inc., Bedford, Ohio Application February 25, 1933. Serial No. 658,504

10 Claims. (Cl. 254—104)

Our invention pertains to means for moving parts, particularly to parts which are tightly fastened on another part and when there is no convenient means of taking hold of the part to be moved.

In many instances, such as a bearing or gear or other part driven tightly on or in other ways stuck tightly on a shaft or the like, it is quite difficult to take hold of the part to move it in relation to the shaft. Quite often the part is located so closely to another part that there is no way of taking hold of the part to be moved. In such and similar instances it is necessary to break the part to be moved or another part adjacent thereto in order to take hold of the part to be moved for removal thereof from the shaft or the like.

This breaking up of parts entails considerable expense in new parts for those broken up and is to be avoided and eliminated and the removal of parts is facilitated in the present invention.

The objects of our invention are:

To provide a wedge means which is adapted to engage a part to be moved on one end thereof and, if necessary, at the outer surface thereof and move the wedge means to act wedgingly against that one end of the part and thereby move the same axially on a shaft or the like for removal thereof.

To provide such a wedge means with an adapter so that the means can be operated in or by a machine or by manual means such as hammering.

To provide such a wedge means with a movable carriage so that wedges can move laterally relative to each other during moving of a part.

To provide such a wedge means with adjustability so that the wedges can be adjusted for differently sized parts.

To provide such a wedge means with an adjusting gage so that wedges may be set to different spaced lateral relations without requiring any measurements.

To provide such a wedge means with locking means so that the wedge means can remain set when a number of parts of the same sort are to be moved successively.

Other objects will appear or will become apparent or obvious upon an inspection of this specification and the accompanying drawing.

We attain our objects by the mechanism illustratively shown in the accompanying drawing in which:

Fig. 1 is a side view of a part moving device embodying our invention, partly in section to more clearly show connections and relations of elements.

Fig. 2 is a front view of Fig. 1 showing more clearly a pair of laterally spaced wedges.

Fig. 3 is a side view showing diagrammatically the general positions of the wedges in relation to the part to be moved to illustrate the relative positions which the wedges may assume when moving of a part is to start.

Fig. 4 is a view similar to Fig. 3 but showing diagrammatically one general relation which the wedges and the part to be moved may assume after the part is moved some distance.

Fig. 5 is a side view of a modified arrangement showing the wedges as having inclined surfaces on both sides thereof.

Fig. 6 is a plan view of a gage to be used for adjusting the laterally spaced wedges.

Similar reference characters refer to similar parts throughout the views.

Our invention contemplates, as one feature thereof, the application of the wedge principle against one end of a part to be moved and moving the wedge transversely of the part to effect wedging against the part and thereby move the same relative to another part.

The wedge comprises two co-operative members 10 and 11 which move relatively to each other longitudinally and laterally. Each of the members may have one inclined surface 12 corresponding to or co-operating with a similar surface on the other member as shown in Figs. 1 to 4 or may have two inclined surfaces 13 and 14 corresponding to or co-operating with the other member as shown in Fig. 5.

The member 10 is shown as being rectangular cross-sectionally and is mounted unrotatably in the block 15 which is slidable in the guideway 16 provided in the adapter 17. The adapter 17 has the socket 18 for reception of the nose of a spindle in a machine or of a member which can be hammered upon so that the device can be used on a power machine or by manual hammering thereon. The screw 19 is tapped into the adapter to hold the block 15 in position after the same has been adjusted in the guideway to correctly locate the wedge member 10.

If the member 10 is intended to be left movable laterally so that the member 10 can locate or position itself in relation to the part to be moved, the screw 19 may be left out of contact with the block 15.

The member 11 is also shown as being rectangular cross-sectionally and is also unrotatably mounted but in the block 20 which is slidably mounted in the guideway 21 provided in the below described carriage. The screw 22 is tapped into the carriage for the same function and purpose as the screw 19, to wit: to lock the block 20 to the carriage or to leave the block free to move in the guideway as desired.

The screw 19 is tapped into the adapter 17 and the end of the screw engages the upper side of the groove 23, longitudinally in a side of the block 15, to keep the wedge member 10 and the block 15 from moving out of the adapter 17 when the end of the screw 19 is not tightened against the bottom of the groove 23. Tightening of the screw 19 against the bottom of the groove 23 prevents automatic moving of the block 15 when so desired while loosening of the screw 19 permits of such automatic moving. This same teaching also applies to the screw 22 and its relation to the block 20 and the groove 24 longitudinally in a side thereof and to the side 25 of the groove 24.

The base 27 is shown as being definitely located on the table 28 and having open top slots or cut outs at the top thereof to form half journals at the bottom of the slots for the diametrically reduced journal parts of the corresponding rollers 29, 30 and 31. The middle part of the base clears the rollers so that the same can rotate freely and are rotatably supported in the respective slots in the base.

The above-mentioned carriage has the face or surface 32 longitudinally at the bottom thereof to contact the rollers and also has the guide flanges 33 and 34 at the sides of the face 32 to contact the ends of the rollers and thereby guide the carriage in movement and to keep the same on the rollers.

The stud 35 has one end thereof threaded into the base and extends through the carriage and has the nut 36 threaded onto the other end thereof and abutting the carriage to hold the same against upward movement thereof.

In the illustration shown in Fig. 3, the part or bearing A is to be moved longitudinally of the shaft part B. The collar C is shown as fixed on the shaft although it may also represent another bearing or other movable part. The parts A and C contact each other in this instance so that the contacting end of the part A on the contacting end of the part C becomes a blind end.

The points of the wedge members 10 and 11 here contact one end of the bearing A at the outer circumference thereof and diametrically opposite each other. A force or power applied to the adapter 17 moves the adapter and the wedge member 10 therein downwardly and wedges both of the wedge members 10 and 11 in between the bearing A and the collar C and thereby causes the bearing to be moved longitudinally of the shaft B and away from the collar C. During this wedging, the members 10 and 11 move the shaft B longitudinally as the wedging proceeds.

During this wedging and longitudinal movement of the shaft B, the lateral relation between the faces 37 and 38 changes and provision is made to let it change automatically in the movable carriage and the blocks movable in the carriage or in the adapter.

The blocks 15 and 20 may be immovably secured to the adapter and the carriage, respectively, in which case the carriage will move and thereby moves the member 11 as occasioned by the contact of the inclined surface thereon on the inclined surface 12 of the member 10.

Figs. 1, 3 and 4 show the different positional relations between the carriage and the base at different longitudinal positions of the wedge members relative to each other.

In instances where more than the above described two point application of wedging is desired or where the wedge members must pass the shaft B, the above described wedge member and block structure may be duplicated and each structure located at respective sides of the axis of the shaft B as is illustratively shown in Fig. 2.

The gage 39 is a flat triangular plate having graduated marks 40 thereon and a projecting part 41 movably engaging the keyway 42 formed in block 15. The screws 43 are tapped into the adapter and extend through the gage to hold the latter in any adjusted relation to the adapter. An edge of the adapter is to be considered as the zero mark as related to the graduation marks which are so spaced that, when the gage is set to a certain mark, the wedge members are spaced a certain distance apart laterally when the same are moved to contact the gage.

While we have shown and described one embodiment of our invention, excepting possibly the showing of the wedge formation, we are aware that our invention can be embodied in other structures and we are also aware that changes and modifications can be made in the structure shown and described within the spirit and intent of the present invention and of the appended claims; therefore, without limiting ourselves to the specific embodiment of our invention as shown and described nor to the specific structure and arrangement of parts as shown and described herein.

We claim:

1. In a parts moving means, a wedge mechanism comprising co-operating wedge members, movable relatively longitudinally in engagement on an end of a part to be moved relative to another part, each of said wedge members mounted in a laterally movable part for lateral adjustment thereof to provide lateral movement of said wedge members relative to the part to be moved, means for retaining said members in adjusted positions, and means to produce relative longitudinal movement of said wedge members to move the part relative to another part.

2. In a parts moving means, a laterally movable carriage, a wedge mechanism comprising co-operating wedge members, movable relatively longitudinally and laterally in engagement on an end of a part to be moved relative to another part, one of said wedge members mounted in said carriage to move laterally and to move said carriage laterally, and means to produce relative longitudinal movement of said wedge members to move the part relative to another part.

3. In a parts moving means, an adapter, a laterally movable carriage, a wedge mechanism comprising co-operating wedge members to contact an end of a part to be moved, one of said members mounted in said adapter, the other one of said members mounted in said carriage, and means to move said one wedge member longitudinally and thereby move the part relative to another part.

4. In a parts moving means, an adapter, a laterally movable carriage, a wedge mechanism comprising co-operating wedge members to contact an end of a part to be moved, one of said members mounted laterally adjustably in said adapter, the other one of said members mounted laterally adjustably in said carriage, and means to move said one wedge member longitudinally and thereby move the part relative to another part.

5. In a parts moving means, a base, a carriage laterally movable relative to said base, a set of carriage supporting rollers journaled in said base and contacting said carriage for support and lateral movement thereof, a wedge mechanism comprising co-operating wedge members to contact an end of a part to be moved, one of said wedge members mounted in said carriage to move the same laterally, and means to move the other one of said wedge members longitudinally and thereby move said one wedge member laterally and move the part to be moved relative to another part.

6. In a parts moving means, an adapter, a laterally movable carriage, a wedge mechanism comprising laterally spaced wedge elements, each composed of co-operating wedge members to contact an end of a part to be moved, one set of said wedge members mounted in said adapter, the other set of said wedge members mounted in said carriage, and means to move said adapter to move said one set of wedge members longitudinally and thereby move said other set of wedge members and said carriage laterally and move the part to be moved relative to another part.

7. In a parts moving means, a base, a set of rollers journaled in said base, a carriage supported on said rollers and laterally movable thereon, an adapter above said carriage, laterally spaced wedge elements each composed of co-operating wedge members to contact an end of a part to be moved, one set of said wedge members laterally adjustably mounted in said adapter, means to hold said wedge members in said adapter in adjusted position, the other set of said wedge members laterally adjustably mounted in said carriage, means to hold said other wedge members in said carriage in adjusted position, and means to move said adapter to move said one set of wedge members longitudinally and thereby move the part to be moved relative to another part.

8. In a parts moving means, an adapter, laterally spaced wedge members laterally adjustably carried by said adapter to engage an end of a part to be moved and to move the same in relation to another part, and a gage adjustable on said adapter to determine the lateral adjustment of said wedge members.

9. In a parts moving means, oppositely related individually movable parts moving members, each having a wedge portion terminating in an edge, said edges to enter between a part to be moved and a part closely adjacent thereto to start separation of the parts upon a relative longitudinal movement between said members, said wedge portions to further separate the parts upon further longitudinal relative movement between said members, each of said members automatically movable laterally individually to locate itself relative to the other and to the parts, and means to longitudinally move said members relatively and thereby separate the parts and move said members laterally as the separation of the parts proceeds.

10. In a parts moving means, a wedge mechanism comprising co-operating wedge members, movable relatively longitudinally for engagement on an end of a part to be moved relative to a closely adjacent part, each of said wedge members mounted in a laterally movable part for lateral adjustment thereof to provide lateral movement for said wedge members relative to said part to be moved, means for retaining said members in adjusted positions, each of said wedge members terminating in an edge to enter between said part to be moved and said closely adjacent part, and means to produce relative longitudinal movement of said wedge members to move the part to be moved relative said adjacent part.

JOHN Y. BLAZEK.
RUSSELL G. ANDERSON.